United States Patent [19]

Herman

[11] Patent Number: 4,513,174
[45] Date of Patent: Apr. 23, 1985

[54] SOFTWARE SECURITY METHOD USING PARTIAL FABRICATION OF PROPRIETARY CONTROL WORD DECODERS AND MICROINSTRUCTION MEMORIES

[75] Inventor: Morton B. Herman, Huntington Station, N.Y.

[73] Assignee: Standard Microsystems Corporation, Hauppauge, N.Y.

[21] Appl. No.: 245,498

[22] Filed: Mar. 19, 1981

[51] Int. Cl.³ .............................. H04L 9/00; G06F 5/00
[52] U.S. Cl. ................................ 178/22.08; 178/22.09; 364/200
[58] Field of Search ... 364/200 MS File, 900 MS File; 178/22.08, 22.09, 22.11

[56] References Cited

U.S. PATENT DOCUMENTS

| | | | |
|---|---|---|---|
| 4,120,030 | 10/1978 | Johnstone | 364/200 |
| 4,168,396 | 9/1979 | Best | 178/22 |
| 4,183,085 | 1/1980 | Roberts et al. | 364/200 |
| 4,211,919 | 7/1980 | Ugon | 235/487 |
| 4,246,638 | 1/1981 | Thomas | 364/200 |
| 4,262,329 | 4/1981 | Bright et al. | 364/200 |
| 4,278,837 | 7/1981 | Best | 178/22.09 |
| 4,306,289 | 12/1981 | Lumley | 364/200 |
| 4,319,079 | 3/1982 | Best | 178/22.09 |
| 4,384,326 | 5/1983 | Devchoudhury | 364/200 |
| 4,433,207 | 2/1984 | Best | 178/22.09 |
| 4,446,519 | 5/1984 | Thomas | 364/300 |
| 4,465,901 | 8/1984 | Best | 178/22.08 |
| 4,471,163 | 9/1984 | Donald et al. | 178/22.08 |

Primary Examiner—James D. Thomas
Assistant Examiner—A. E. Williams, Jr.
Attorney, Agent, or Firm—Roberts, Spiecens & Cohen

[57] ABSTRACT

For a microcomputer system including a program memory and a microprocessor having means for executing sets of microinstructions which includes an instruction decoder and a microinstruction memory for storing the sets of microinstructions wherein each set of microinstructions is associated with a publicly known OP code, and wherein each set being activated in response to a related control word there is disclosed a method for securing from unauthorized copying a program stored in the program memory consisting of instruction words, with each instruction word including a control word wherein each of the instruction words is stored in a program memory external to the microprocessor. The method includes the steps of defining a set of proprietary control words wherein each proprietary control word is associated with a distinct publicly known OP code and its set of microinstructions of recording the program to be protected in the program memory with each instruction word including the proprietary control word associated with a desired set of microinstructions, and of fabricating the instruction decoder means and the microinstruction memory of the microprocessor so that each received proprietary control word is converted to the address of the microinstruction memory which stores the first microinstruction of the set of microinstructions associated with such received proprietary control word.

4 Claims, 1 Drawing Figure

MICRO COMPUTER SYSTEM

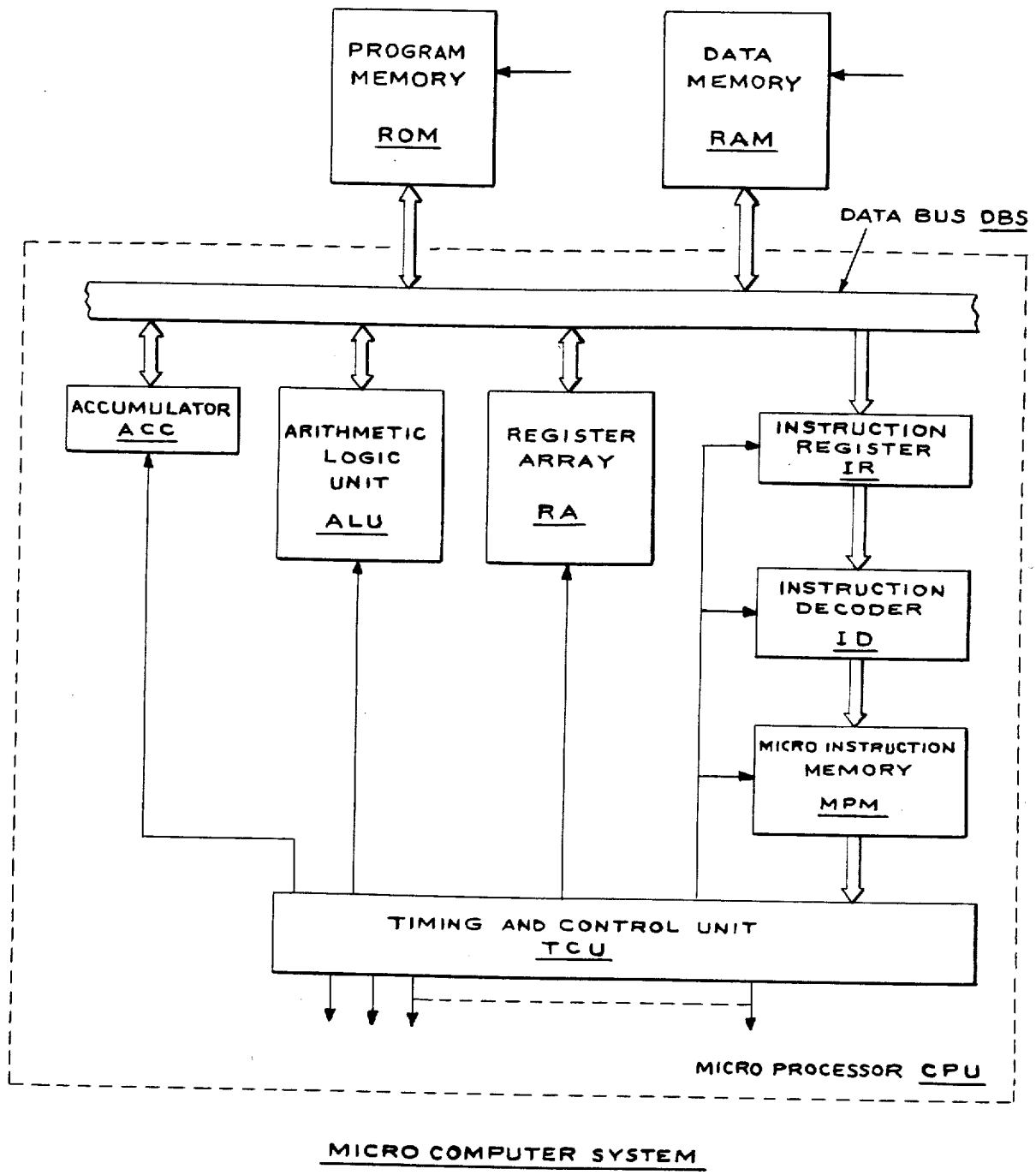

SOFTWARE SECURITY METHOD USING PARTIAL FABRICATION OF PROPRIETARY CONTROL WORD DECODERS AND MICROINSTRUCTION MEMORIES

BACKGROUND OF THE INVENTION

This invention pertains to computer programs stored in read-only memories and, more particularly, to preventing the copying of such programs from the memory.

A microcomputer system generally comprises a microprocessor, a random access memory and a program read-only memory. These three units in addition to other devices are generally interconnected by a bus. The program read-only memory normally stores the application software, i.e., the program to be performed by the microcomputer system. In many cases, this program is specially designed to perform a particular set of operations. The program may be very unique and may have required considerable time and effort to construct. Thus, the program can be a very valuable piece of proprietary information.

It is notoriously well known that many such valuable programs are easily pirated and sold for relatively small amounts of money since the pirater invested negligible time in copying the program. It should be realized that such programs which are stored in these read-only memories are easy to copy since the sole function of the read-only memory is to be read. Therefore, one need only have access to the microcomputer system and instruct the system to read out the contents of the program read-only memory. If this is not possible, one may obtain the memory chip itself and use this memory chip in conjunction with a microprocessor which is instructed to read out the contents of the program read-only memory.

The state of the industry is such that there are available many types of microprocessors. Each of these microprocessors has its own instruction set and along with the instruction set, a publicly known set of OP (operation) codes or mneumonic which define the instruction set associated with each such OP code is a set of microinstructions which sequence the microprocessor through the instruction indicated by the OP code. Thus, when one programs a conventional microprocessor as, for example, an Intel 8080, one knows the operations that the microprocessor can perform and one also knows the OP code set required to have the microprocessor perform the functions. Normally, one then writes the program using these publicly known OP codes or mneumonic; thereafter, the program is loaded via an assembler into a read-only memory as control bytes. Each byte is unique to an OP code or mneumonic. If the microcomputer system is to be mass produced, one then amasses a set of the conventional microprocessors and also has prepared a set of program read-only memories uniquely recorded with the control bytes of the program. (These read-only memories can be mass produced using conventional masking techniques during their fabrication.) Then each microprocessor is assembled with one of these program read-only memories and other necessary components to form the microcomputer system.

Normally, in operation, the control byte of an OP code is read from the program read-only memory into the microprocessor and is converted to an address. This address is used to select the first register of a series of microinstructions stored in the microinstruction read-only memory within the microprocessor. This results in the reading out of a sequence of microinstructions which cycle the microprocessor through the instruction step defined by that OP code or mneuomonics associated with the control byte.

Thus, it is seen that if one sequentially reads the set of control bytes from the program memory, one then has complete information about the program since one knows from published information which OP code is associated with each read-out control byte and what is the function of each OP code and how it is used to sequence the microprocessor through an instruction step.

Again, since many of the application programs stored in the program read-only memories require considerable time and money to develop, they are extremely valuable as units of industrial property.

SUMMARY OF THE INVENTION

It is a general object of the invention to provide a method for preventing the copying of the program stored in the program read-only memory which controls the operation of a microprocessor in a microcomputer system.

It is another object of the invention to render meaningless to an unauthorized user the sequence of control bytes read from the program read-only memory of a microcomputer system.

Briefly, the invention concerns a microcomputer system including a microprocessor which has means including a microinstruction read-only memory for executing sets of microstep instructions wherein each set is activated in response to a related control word; the system also includes a program read-only memory separate from the microprocessor. The program read-only memory stores a sequence of instruction words wherein each instruction word includes a control word associated with an OP code. For such a microcomputer system, there is contemplated a method of securing from unauthorized copying the program stored in the program read-only memory. The method contemplates defining a set of proprietary control words with each control word being associated with a distinct set of microinstructions and a publicly known OP code or mneumonic. The program to be protected is recorded in the program read-only memory with each instruction word including the proprietary control word associated with a desired set of microinstructions. The instruction decoder means and microinstruction read-only memory of the microprocessor are fabricated so that each received proprietary control word is converted to an address of a register in the microinstruction read-only memory which holds the first microinstruction of the set of microinstructions associated with such received proprietary control word.

It is thus seen that when one uses a conventional microprocessor and one reads out the contents of the program read-only memory connected thereto, the series of control words read out make absolutely no sense when measured against the standard published OP code (mneumonic) set. Therefore, by merely reading the set of control words, a pirate cannot get an inkling of the program. Furthermore, if the program is merely copied in a straightforward manner and loaded into a program read-only memory for use with the conventional microprocessor, (the conventional microprocessor in this case cannot translate the read control words of the starting addresses of the desired sets of microinstructions) the microprocessor will decode the control words in the usual manner, but since these proprietary control words bear no real relation to the starting addresses of the sets of microinstructions stored in the microinstruction read-only memory of the microinstruction memory within the microprocessor, the microprocessor will not perform a useful function.

BRIEF DESCRIPTION OF THE DRAWINGS

Other objects, the features and advantages of the invention will now be apparent from the following detailed description when read in conjunction with the accompanying drawing whose sole FIGURE shows a microcomputer system which is useful in explaining the invention.

DESCRIPTION OF THE PREFERRED EMBODIMENT OF THE INVENTION

In the sole FIGURE, there is shown a microcomputer system including a microprocessor CPU a program memory ROM (of the read-only type) and a data memory RAM. The program memory ROM stores the program which controls the operation of the central processing unit CPU to perform the desired task for the system. Stored in the program memory ROM is the proprietary program which one desires to protect from unauthorized copying or piracy. The instruction steps of this program are fed to the instruction register IR of the central processing unit CPU via the data bus DBS. Each instruction step, including its control word, is fed to the instruction register IR and from there to the instruction decoder ID. The instruction decoder ID then decodes the control word to the address for the start of the set of microinstructions stored in the microinstruction memory MPM. Since the microprocessor CPU, the data memory RAM, and the program memory ROM operate in a conventional manner, the operation of the system will not be described. The actual operation of the system is not necessary for an understanding of the invention. The only parts of the system which are related to the invention are the program memory ROM and the instruction decoder ID or the microprogram memory MPM. The program memory ROM can be a conventional LSI programmable read-only memory; and the instruction decoder ID can be a read-only memory, a matrix-type decoder or a programmed logic array or the microinstruction memory can be a programable read-only memory. The actual embodiment of the decoder ID is not crucial to the invention.

According to the invention, the program memory ROM, the data memory RAM and the microprocessor CPU are preferably large-scale integrated circuits which are fabricated using conventional techniques as shown and described in the book entitled MOS FIELD EFFECT TRANSISTORS AND INTEGRATED CIRCUITS by Paul Richman, published by John Wiley & Sons, in 1973. An improvement on those techniques which is ideally suited for the present invention is shown in U.S. Pat. No. 4,080,718 of Paul Richman issued Mar. 23, 1978. In that patent, it is taught to partially fabricate the large-scale integrated circuit up to a late stage in its manufacture and then thereafter finish a custom fabrication of the chip. For example, if the chip is a matrix that is utilized in a programmable read-only memory, the fabrication proceeds to the point where the next step would be the "printing" of the logic ones and zeros at the intersections of the matrix. These partially completed chips would then be stored until there was a call for the customizing of the chips to incorporate a particular program. At that time, the mask required for the customizing would be fabricated and the manufacture would continue with the mask programming step followed by the forming of the overlying passivation layers to provide the protective covering for the device. Since the instruction decoder of the central processing unit is also a matrix or an array requiring the programming of the logic ones and zeros, the microprocessor can also be fabricated up to that point. (In addition, if necessary, as hereinafter becomes apparent, the microinstruction read-only memory of the microprocessor can be similarly fabricated.) Then these microprocessors would also be stored for later customizing in accordance with the needs of the customer. For example, the customizing mask would be used for forming the ones and zeros in the instruction decoder matrix or the microinstruction read-only memory while shielding the remainder of the chip. Thereafter the overlaying passivation layers would be formed.

In accordance with the invention, there will first be fabricated the partially manufactured LSI chips for both the program read-only memory and the microprocessor. In addition, a programmer prepares the actual program as a sequence of instruction words. Preferably, to simplify the writing of the program, the programmer uses the conventional set of instruction words and OP codes publicly known for the particular type of central processing unit being used. However, in addition to writing the program using the publicly known OP codes, the programmer would define a set of proprietary control words. In particular, for every publicly known OP code he would write his own proprietary control word to replace the conventionally known control words. The next step in the operation would be to convert every one of the publicly known OP codes in the written program to its corresponding proprietary control word. This conversion could be done either manually by the programmer or in an assembler programmed computer utilizing, say, table look-up functions. Thus, one would have the program written with the proprietary set of control words. At this point, one could then take the partially manufactured programmable read-only memories for the program memories of the microcomputer system and finish the fabrication by recording therein utilizing conventional masking techniques as described in said Richman patent the program with the proprietary set of control words. It should be noted at this point, if one then utilized one of these completely fabricated program read-only memories with the conventional microprocessor, the thusly formed system could produce no useful results. Furthermore, if a pirate obtained one of these program read-only memories and utilized it with the conventional microprocessor to read-out the contents of the program read-only memory, the program thusly read-out would be nonsensical when studied with respect to the publicly known control words.

Therefore, as the final steps of the invention, it is now necessary to customize the microprocessor. There are two ways of customizing the microprocessor. One can either customize the instruction decoder portion or one can customize the microprogram read-only memory. In either case, one would now take the partially fabricated microprocessors as a start. For the presently preferred embodiment a mask would be prepared for the instruction decoder portion thereof. This mask would be coded so that the instruction decoder when it receives a proprietary control word convert that proprietary control word to the conventional microprogram memory address that is associated with the publicly known OP code and control word. For example, if the publicly known OP code or mneumonic is a LDA and under conventional circumstances this OP code was converted by the assembler to, say, the binary control word 01001011 and the instruction decoder decoded this control word to address XYZ (the address of the first microinstruction of the set associated with mneumonic LDA, then the instruction decoder would be mask programmed such that when it would receive the proprietary control word such as 11011101 which is equivalent to the publicly known control word 0101011, then the decoder would decode the proprietary control word to the address XYZ. In this way, when the program is run, each of the proprietary control words is converted to the same microprogram memory address as when the corresponding publicly known control word is decoded by a non-customized instruction decoder is the conventional microprocessor. In effect, it is seen for this embodiment of the invention that for each set of proprietary control words, there will be a unique microprocessor wherein the uniqueness merely lies in the constitution of the instruction decoder.

According to another embodiment of the invention, the microprocessor's instruction decoder is conventional but the microinstruction read-only memory is customized. In particular, for each decoding of a proprietary control word there will be generated an address by the conventional instruction decoder. It will then be necessary to customize the microinstruction read-only memory to insure that the set of microinstructions associated with the proprietary control word begins at that address.

For example, in the prior art the proprietary OP code or mneumonic LDA is conventionally converted by an assembler to control word 01001011 and decoded by a conventional decoder to address XYZ of a conventional microinstruction read-only memory, the address XYZ being the starting address of the set of microinstructions which execute the program setup called for by OP code LDA. According to this embodiment of the invention, the proprietary OP code LDA is converted by an assembler (or by hand) to say the control word 11011101. The conventional decoder of the customized microprocessor would decode this word to, say, address PGR of the customized microinstruction read-only memory of the customized microprocessor. The microinstruction read-only memory would be customized to insure that the set of microinstructions corresponding to OP code LDA would begin at address PGR.

Thus, it is seen that one can use the specifications and instruction sets of conventional publicly available microprocessors and write a program using publicly known OP codes, convert the program with publicly known OP codes to instructions with proprietary control words, record the program in the program read-only memories utilizing the proprietary control words instead of the publicly known control word, and merely either customize the instruction decoder or the microinstruction read-only memory of the microprocessor to provide a system wherein the proprietary program stored in the read-only memory is relatively secure from copying by unauthorized personnel.

While only two embodiments of the invention has been shown and described in detail, there will now be apparent to those skilled in the art many modifications and variations satisfying many or all of the objects of the invention without departing from the spirit thereof as defined in the appended claims.

For example, one need not use the masking and fabrication techniques shown in the above-cited Richman patent. One could use other types of read-only memories such as the fusible link type or variations thereof wherein the programming is done after the fabrication of the device. Similarly, it may be possible to do the same for the central processing unit.

I claim:

1. For microcomputer systems which include a program memory and a microprocessor having executing means for executing sets of microinstructions, said executing means including a microinstruction memory for storing sets of microinstructions and an instruction decoder means for converting a control word to a microinstruction memory address, each set of microinstructions being assigned a publicly known OP code, and each set being activated in response to a related control word, the method of securing from unauthorized copying of a program stored in the program memory as a sequence of instructions wherein each instruction includes a control word, said method comprising the steps of defining a set of proprietary control words wherein each control is assigned a distinct publicly known OP code and its set of microinstructions, initially partially fabricating the microprocessors including their microinstruction memories such that each microinstruction set starts at a known address, said partially initially fabricating step, including an incomplete fabrication of the instruction decoder means, finishing the fabricating by completely fabricating the instruction decoder means such that each proprietary control word received by an instruction decoder means is converted to the address of the microinstruction memory which stores the first microinstruction of the set of microinstructions assigned to such received proprietary control word, and recording the program to be protected in the program memories wherein each instruction includes the proprietary control word assigned to a desired set of microinstructions.

2. For microcomputer systems which include a program memory and a microprocessor having executing means for executing sets of microinstructions, said executing means including a microinstruction memory for storing sets of microinstructions and an instruction decoder means for converting a control word to a microinstruction memory address assigned to a publicly known OP code, and each set being activated in response to a related control word, the method of securing from unauthorized copying a program stored in the program memory as a sequence of instructions, each instruction including a control word, said method comprising the steps of defining a set of proprietary control words wherein each proprietary control word is assigned to a distinct publicly known OP code and its set of microinstructions, initially fabricating the microprocessors except for their microinstruction memories but including their instruction decoder means, said instruction decoder means being fabricated to generate a unique microinstruction address for each received control word, finishing fabrication including the fabrication of the microinstruction memories in such a way that the first microinstruction of a set of microinstructions related to a proprietary control word is stored in the address generated by an instruction decoder means in response to the receipt of said proprietary control word, and recording the program to be protected in the program memories wherein each instruction includes the proprietary control word associated with a desired set of microinstructions.

3. The method of claim 1 wherein a program is initially prepared using the publicly known OP code set used by the microprocessor, converting at least parts of the publicly known OP codes of the program to the corresponding proprietary control words, and recording in the program memory the program with the corresponding proprietary control words.

4. The method of claim 2 wherein a program is initially prepared using the publicly known OP code set used by the microprocessor, converting at least parts of the publicly known OP codes of the program to the corresponding proprietary control words, and recording in the program memory the program with the corresponding proprietary control words.

* * * * *